United States Patent [19]

Orsano

[11] Patent Number: 5,477,635
[45] Date of Patent: Dec. 26, 1995

[54] SIGNALING APPARATUS FOR USE WITH A DISPOSABLE ANIMAL TRAP

[76] Inventor: Anthony Orsano, 529 Marcellus Rd., Williston Park, N.Y. 11596

[21] Appl. No.: 84,580

[22] Filed: Jun. 29, 1993

[51] Int. Cl.[6] ............................................. A01M 23/30
[52] U.S. Cl. ................................. 43/81; 43/96; 43/98
[58] Field of Search ................................ 43/81, 58, 96, 43/98

[56] References Cited

U.S. PATENT DOCUMENTS

| | | | |
|---|---|---|---|
| 1,154,756 | 9/1915 | Georgeson | 43/96 |
| 1,594,287 | 7/1926 | Wehmann | 43/98 |
| 2,554,728 | 5/1951 | Barber | 43/96 |
| 3,468,054 | 9/1969 | Levine | 43/98 |
| 4,048,746 | 9/1977 | Dye | 43/98 |
| 4,393,617 | 7/1983 | Charnoske | 43/96 |
| 4,719,718 | 1/1988 | Kon | 43/81 |
| 5,154,017 | 10/1992 | Disalvo | 43/81 |
| 5,184,416 | 2/1993 | Brewer | 43/81 |

*Primary Examiner*—Kurt Rowan
*Attorney, Agent, or Firm*—Lieberman & Nowak

[57] ABSTRACT

A signaling apparatus indicates when a disposable animal trap has been triggered. The apparatus detects movement of the bail, indicating that the trap has been triggered. A visual or audible alarm is used to notify the user. This allows the trap to be reset if the bait is lost, or replaced if an animal has been trapped. Advantages of a signaling apparatus have now been extended to a disposable trap.

22 Claims, 2 Drawing Sheets

SIGNALING APPARATUS FOR USE WITH A DISPOSABLE ANIMAL TRAP

BACKGROUND OF THE INVENTION

The invention relates to a signaling apparatus for use in connection with disposable animal traps, and more particularly, to a signaling apparatus for use with disposable mouse or rat traps.

It is long been realized that a signaling device is a beneficial addition to an animal trap. For example, Dye, U.S. Pat. No. 4,048,746, issued Sep. 20, 1977, teaches an electronic rodent exterminator having means for notifying the operator when a rodent has demised itself. U.S. Pat. No. 4,393,617, issued Jul. 19, 1993 to Charnoske and U.S. Pat. No. 1,154,756, issued Sep. 28, 1915 to Georgeson, show various signaling devices for use in connection with traps. Barber, U.S. Pat. No. 2,554,728, issued May 29, 1951, and Wehmann, U.S. Pat. No. 1,594,287, issued Jul. 27, 1926, each teach electrical switches combined with animal traps for signaling when an animal has been caught.

More recently, Brewer, U.S. Pat. No. 5,184,416, issued Feb. 9, 1993, teaches a signaling mouse trap apparatus in which two contacts are provided so that when the bail of the mousetrap is engaged with the mouse, an electrical connection is made between the contacts, thus setting off an alarm. The contents of the above-identified patents are herein incorporated by reference.

The problem with known signaling traps is that the traps are intended for multiple trappings. Thus, the user of the trap must clean the trap between uses. This is both inconvenient and unsanitary. Moreover, certain animal scents left on a trap can warn subsequent animals of danger, making the trap less effective.

Disposable rodent traps are well known and sold in most hardware stores. These disposable traps are typically sold in three-packs for mouse traps and individually for rat traps. These traps typically utilize a spring loaded bail which is activated when the animal takes the bait. The bail moves from a set position to an engaging position to kill the animal.

The subject signaling device attaches to a commercially available trap and is activated when the bail moves from the set position to the engaging position. Thus, the invention provides all the advantages of a disposable trap coupled with the advantages of a signaling apparatus formerly reserved for multiple-use devices. Advantages of a subject signaling apparatus include more effective trap use (unbaited traps are detected and spent traps can be removed), elimination of unsanitary conditions, (dead animals can be removed before they deteriorate to a malodorous, parasite ridden condition), low cost and ease in manufacture.

SUMMARY OF THE INVENTION

The invention provides a signaling device for use with the disposable animal trap having a movable bail. The apparatus comprises a housing, means for detecting motion of the bail (coupled to the housing), means for generating a signal in response to the detection of bail motion by the detecting means, and means for removably affixing the housing to the disposable animal trap.

Preferably, the housing encloses the signal generating means and the motion detecting means comprise a switch which is triggered by the motion of the bail. Triggering of the switch allows current to flow to the signal generating means.

The motion detecting means may also comprise a photoelectric detector. Activation of the photoelectric detector allows current to flow to the signal generating means.

The signal generating means may comprise a light, such as a light emitting diode or an audible alarm.

Means for removably affixing the housing to the disposable animal trap often times, comprise a clip mounted on the housing, and more preferably use a plurality of clips. Alternatively, an adhesive may be used.

The invention also provides a signaling device for use with the disposable animal trap, which comprises a housing, caught-animal-detection means for detecting the presence of an animal caught in the trap (the means being coupled to the housing), means for generating a signal in response to the detection of the animal by the caught-animal-detection means, and means for removably affixing the housing to the disposable animal trap.

Preferably, the caught-animal-detection means comprise a switch which is triggered by the motion of the animal so that the triggering the switch allows current to flow to the signal generating means. Alternatively, the motion detecting means comprise a photoelectric detector which allows current to flow to the signal generating means.

The signal generating means generally comprise a light, such as an LED. The means for removably affixing the housing to the disposable animal trap generally comprise a clip mounted on the housing.

DETAILED DESCRIPTION OF THE INVENTION

The subject invention will now be described in terms of its preferred embodiments. These embodiments are set forth to aid in understanding of the invention, but are not to be construed as limiting.

Figure 1:
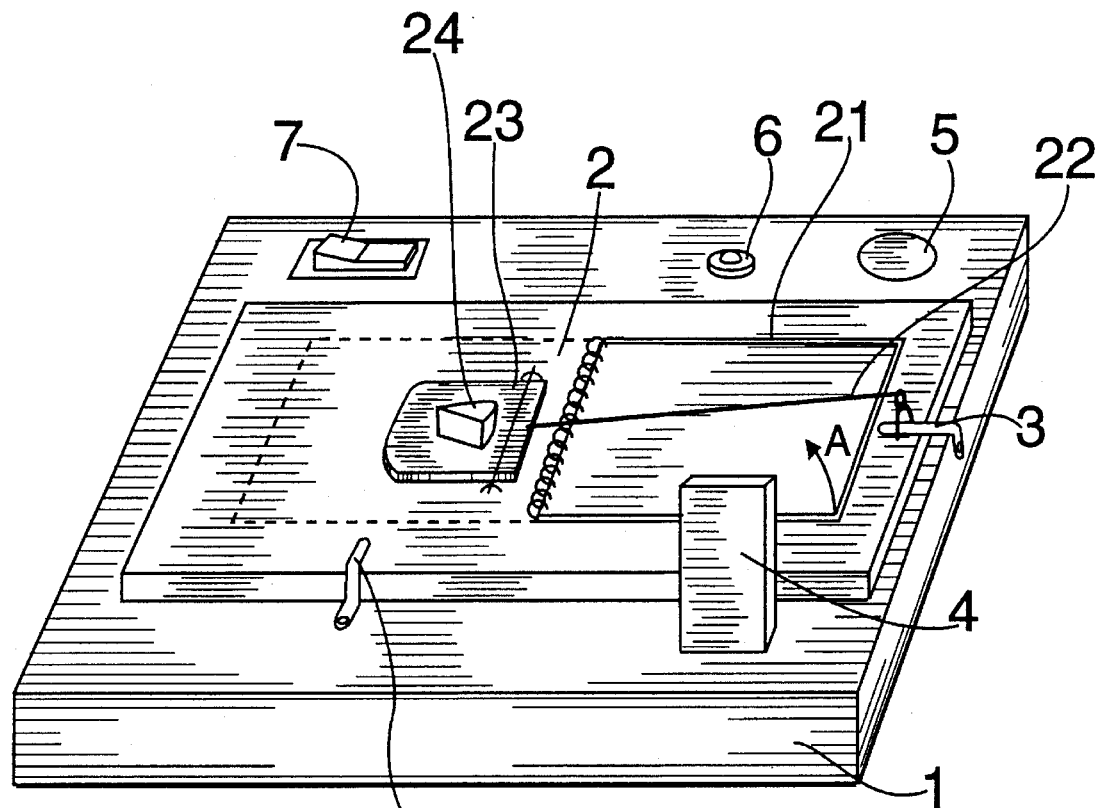
FIG. 1—A perspective view of an embodiment the subject invention having a disposable mouse trap placed thereon.

The subject invention will now be described with reference to the attached figures. FIG. 1 shows a perspective view of the subject device. The device includes housing 1 to which is typically mounted the remaining components of the signaling apparatus. Trap 2 generally fits on top of housing 1, although other configurations may also be used. The construction of a standard disposable animal trap is such that bail 21 is held in place by catch 22 which is releasably held in place by bait tether 23. When the animal takes bait 24, bait tether 23 is shifted thereby releasing catch 22. When this occurs, bail 21 moves in the direction shown by arrow A until it reaches the engaging position (shown in phantom in FIG. 1).

Trap 2 is secured to housing 1, typically by a plurality of clips 3. Alternatively, trap 2 may be mounted to housing I by the use of a removable adhesive, screws, pins, a track for slidably engaging trap 2, etc. FIG. 1 shows two spring metal clips 3 and FIG. 2 shows four plastic compression clips 3 which hold the trap in place.

Figure 3A:
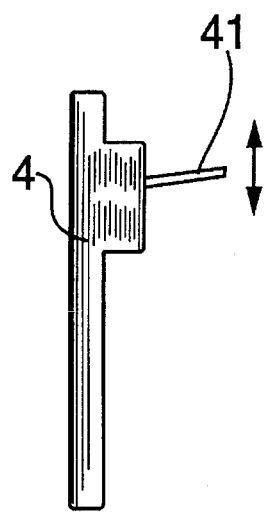
FIG. 3A—An isolated view of a mechanical switching mechanical means for detecting motion of the bail.
Figure 3B:
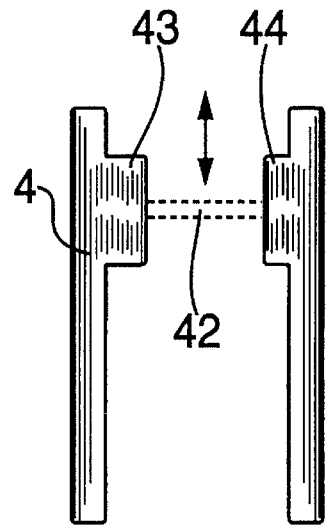
FIG. 3B—An isolated view of a photoelectric device (electric eye) which acts as a switch to detect motion of the bail.

Movement of bail 21 from the set position to the engaging position is detected by detector 4. As shown in FIG. 3A, detector 4 may be a mechanical detector. Detector 4 may also be a photoelectric detector (electric eye) as shown in FIG. 3B. For the mechanical detector, movement of the bail typically contacts lever 41. Movement of lever 41 causes a switch to close thereby allowing current to flow through the circuit (see FIG. 4). It must be realized that this simple electrical concept can be accomplished in multiple ways. For example, a current could be constantly passing through the circuit and the triggering of lever 41 could open the circuit thereby allowing current to flow through a subsequent circuit to trigger the signaling means.

Figure 2:
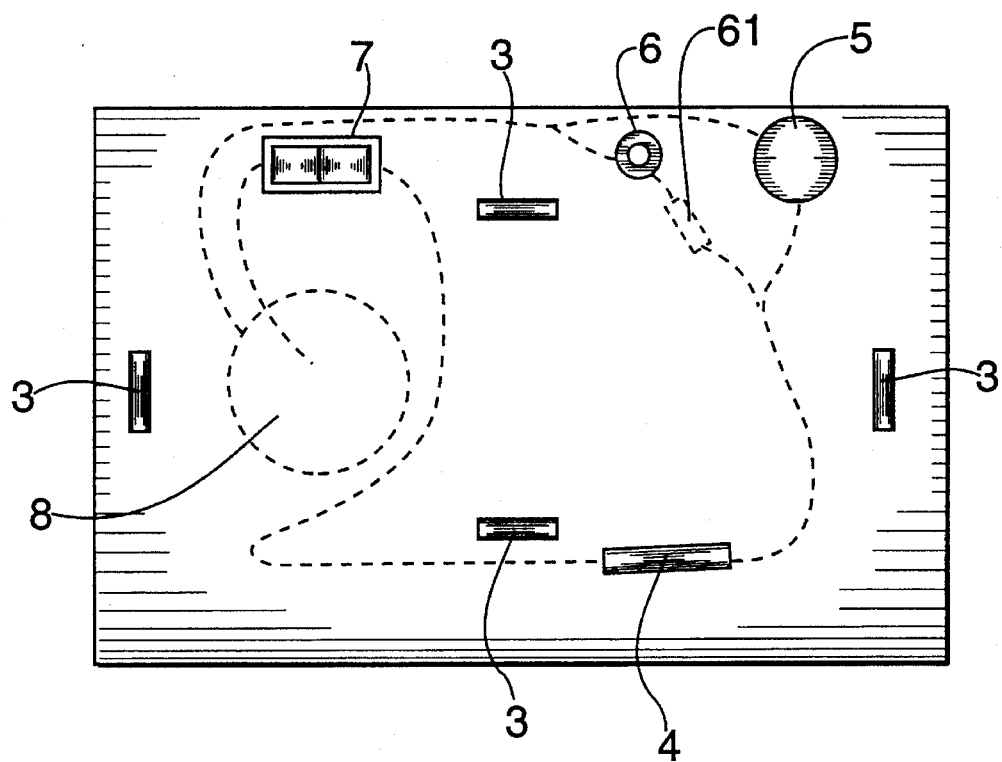
FIG. 2—A top view of an embodiment the subject device.

Alternatively, as shown in FIG. 2, detector 4 may be a detector for detecting the presence of an animal within the trap, such detector may be photoelectric, infra-red, e.g. heat detection, mechanical, etc.

Returning to FIG. 1, housing 1 typically contains audible alarm 5 and light emitting device 6. Again, alterations of these two signaling forms are widely known to those skilled in the art. For example, audible alarm may 5 be a beep, series of beeps, melody, voice command, etc. Means for generating audible alarms are known in the art. Light emitting device 6, may be a light emitting diode (LED), strobe, flash, liquid crystal display (LCD), computer printout, etc. Conceivably, the signaling means could activate an automatic telephone dialer (perhaps to call an exterminator), paging system, central alarm or the like.

To allow easy setting of the apparatus, an on/off switch 7 is typically provided. FIG. 2 shows a top view of the subject apparatus in the absence of trap 2 and better illustrates a currently preferred geometries which are mass manufacturable at low cost. The circuit is shown in phantom. Battery 8 is connected electrically to switch 7 which is connected to detector 4 which is connected in parallel to light emitting device 6 (via a resistor 61) and audible alarm 5, which in turn return to battery 8.

FIG. 3B shows a photoelectric sensor wherein the movement of bail 21 through beam of light 42 triggers the generation of a signal. A typical photoelectric sensor uses a light generating side 43 and a reflecting side 44. Although photoelectric and mechanical motion detection means have been described in detail, other suitable means may be employed. For example, a magnetic device may be used to detect movement of bail 21 which is generally formed from metal.

Figure 4:
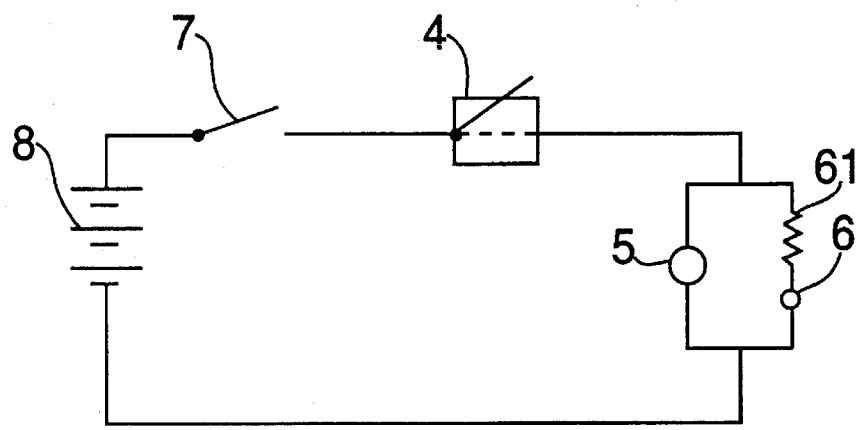
FIG. 4—A schematic of the electrical circuit used in the subject invention.

FIG. 4 shows a schematic representation of the subject apparatus. An electrical source 8, typically a 3 or 6 volt battery, is used to power the apparatus. The source of current 8 may also be a standard household current, or a household current transformed to a direct current. As depicted, current flows from source 8 through on/off switch 7 (shown in the open position) through detector 4 and then to light emitting device 6 and audible alarm 5. Current is returned to source 8.

Upon reading the subject disclosure, numerous alterations and modifications will become obvious to those skilled in the art. These variations are to be considered within the scope and spirit of the subject invention, which is only to be limited by the claims which follow and their equivalents.

What is claimed is:

1. A reusable signaling device for use with disposable animal trap having a movable bail, which comprises:
    (a) a housing shaped and dimensioned to receive the disposable animal trap;
    (b) bail-motion-detection means for detecting motion of the bail of the disposable animal trap, the bail-motion-detection means being coupled to the housing;
    (c) signal-generation means for generating a signal in response to the detection of bail motion by the bail-motion-detection means, the signal-generation means being secured to the housing of the signaling device; and
    (d) removably-affixation means for removably affixing the disposable animal trap to the housing of the signaling device.

2. A signaling device of claim 1, wherein the housing encloses the signal-generation means.

3. A signaling device of claim 1, wherein the bail-motion-detection means comprise a switch which is triggered by the motion of the bail.

4. A signaling device of claim 3, wherein the triggering of the switch allows current to flow to the signal-generation means.

5. A signaling device of claim 1, wherein the bail-motion-detection means comprise a photoelectric detector.

6. A signaling device of claim 5, wherein activation of the photoelectric detector allows current to flow to the signal-generation means.

7. A signaling device of claim 1, wherein the signal-generation means comprise a light.

8. A signaling device of claim 7, wherein the light is a light emitting diode.

9. A signaling device of claim 1, wherein the signal-generation means comprise an audible alarm.

10. A signaling device of claim 1, wherein the removably-affixation means for removably affixing the disposable animal trap to the housing of the signaling device comprises a clip mounted on the housing.

11. A signaling device of claim 10, wherein a plurality of clips are mounted on the housing.

12. A signaling device of claim 1, wherein the removably-affixation means for removably affixing the disposable animal trap to the housing of the signaling device comprises an adhesive.

13. A signaling device of claim 1, wherein the removably affixation means for removably affixing the disposable animal trap to the housing of the signaling device is secured to the housing.

14. A reusable signaling device for use with a disposable animal trap, which comprises:
    (a) a housing shaped and dimensioned to receive the disposable animal trap; (b) caught-animal-detection means for detecting the presence of an animal caught in the disposable animal trap, the caught-animal-detection means being coupled to the housing;
    (c) signal-generation means for generating a signal in response to the detection of the animal by the caught-animal-detection means, the signal-generation means being secured to the housing of the signaling device; and
    (d) removably-affixation means for removably affixing the disposable animal trap to the housing of the signaling device.

15. A signaling device of claim 14, wherein the caught-animal-detection means comprise a switch which is triggered by the motion of the animal.

16. A signaling device of claim 15, wherein the triggering of the switch allows current to flow to the signal-generation means.

17. A signaling device of claim 14, wherein the caught-animal detection means comprise a photoelectric detector.

18. A signaling device of claim 17, wherein activation of the photoelectric detector allows current to flow to the signal-generation means.

19. A signaling device of claim 18, wherein the signal-generation means comprise a light.

20. A signaling device of claim 19, wherein the light is a light emitting diode.

21. A signaling device of claim 14, wherein the removably-affixation means for removably affixing the disposable animal trap to the housing of the signaling device comprises a clip mounted on the housing.

22. A signaling device of claim 14, wherein the removably affixation means for removably affixing the disposable animal trap to the housing of the signaling device is secured to the housing.

* * * * *